United States Patent [19]

Garey

[11] 3,731,109

[45] May 1, 1973

[54] MAGNETIC DOMAIN LOGIC APPARATUS

[75] Inventor: Michael Randolph Garey, Summit, N.J.

[73] Assignee: Bell Telephone Laboratories, Incorporated, Murray Hill, N.J.

[22] Filed: June 17, 1971

[21] Appl. No.: 154,144

[52] U.S. Cl......307/88 LC, 340/174 TF, 340/174 SR
[51] Int. Cl..........................G11c 11/14, G11c 19/00
[58] Field of Search................................340/174 TF; 307/88 LC

[56] References Cited

OTHER PUBLICATIONS

IBM Technical Disclosure Bulletin, "Bubble Domain Logic Devices" by Lin Vol. 13, No. 10, 3/71, p. 3068, 3068a.

IBM Technical Disclosure Bulletin, "Combination And/Or Logic Device" by Genovese, Vol. 13, No. 6, 11/70, p. 1522, 1523.

IBM Technical Disclosure Bulletin, "And/Or Combinatorial Bubble Domain Logic Device" by Almasi et al., Vol. 13, No. 6, 11/70, p. 1410.

IBM Tech. Disc. Bulletin "Angelfish Logical Connectives for Bubble Domains" by Almasi et al., Vol. 13, No. 10, 3/71; p. 2992, 2993.

*Primary Examiner*—Stanley M. Urynowicz, Jr.
*Attorney*—R. J. Gunther et al.

[57] ABSTRACT

Magnetic domain logic cells for performing a wide variety of elementary logic operations are described. The cells are arranged so that any number can be compatibly interconnected to perform any logical functions realizable with conventional logic circuit devices.

28 Claims, 23 Drawing Figures

INVENTOR
M. R. GAREY
BY Gerard E. Murphy
ATTORNEY

TRANSMISSION CELL

FIG. 7 INVERTER CELL
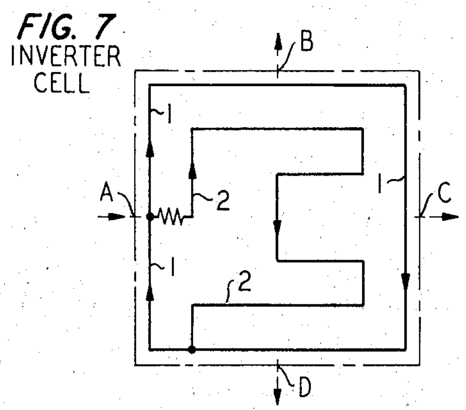
FIG. 8 CROSSOVER CELL
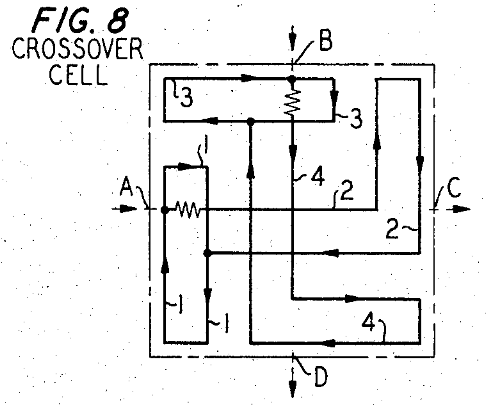
FIG. 9 AND CELL
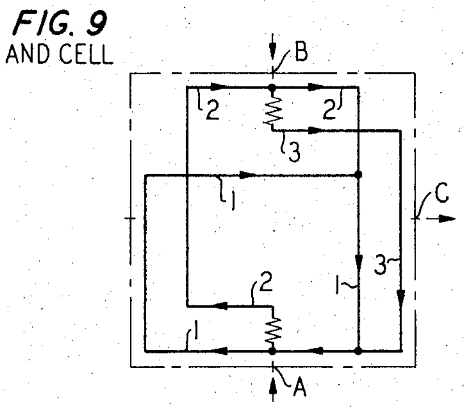
FIG. 10 OR CELL
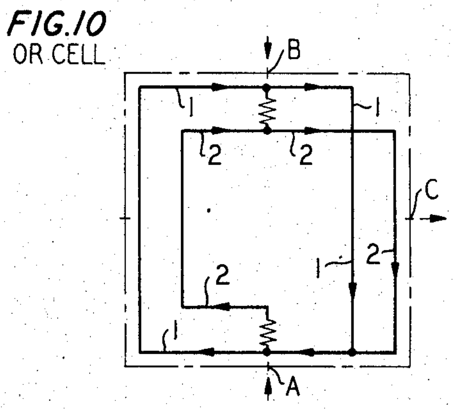
FIG. 11 NAND CELL
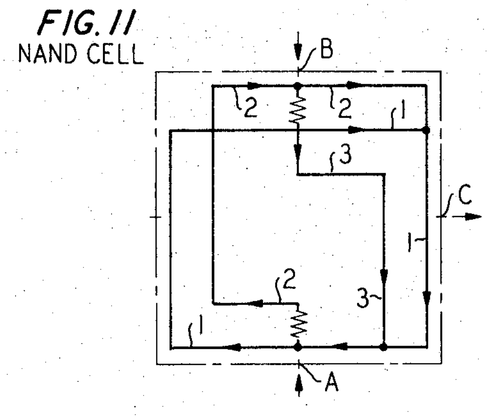
FIG. 12 NOR CELL
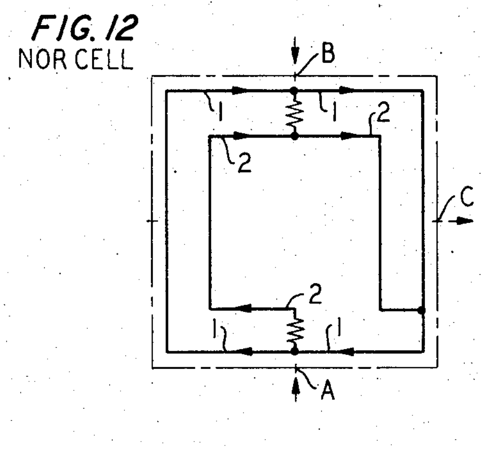
FIG. 13 EXCLUSIVE OR CELL
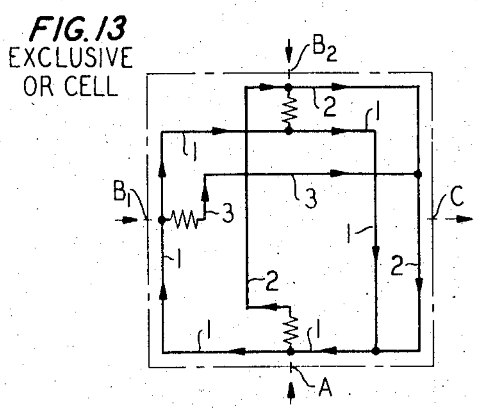
FIG. 14 FLIP-FLOP CELL
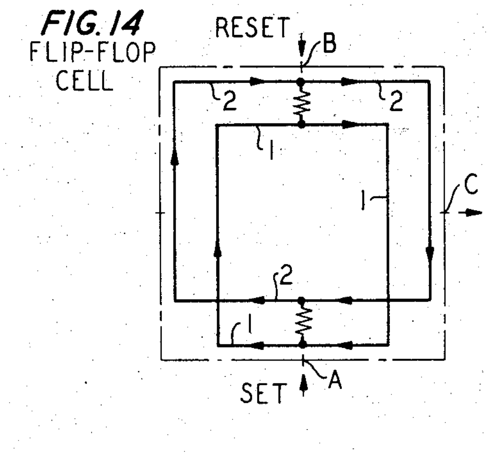

MAGNETIC DOMAIN LOGIC APPARATUS

BACKGROUND OF THE INVENTION

1. Field of the Invention

This invention relates to digital information processing and more particularly to the transmission and logical manipulation of digitally coded information by means of the controllable propagation of movable magnetic domains.

2. Description of the Prior Art

The *Bell System Technical Journal*, Volume XLVI, No. 8, October 1967, at page 1901 et seq. describes magnetic domains which are bounded by a single domain wall and which are free to move in the plane of a sheet or slice of a suitable domain medium (e.g., a rare earth orthoferrite material). When viewed perpendicularly to the abovementioned plane, these domains appear as circular areas of reverse-magnetized medium material.

U. S. Pat. No. 3,534,347, issued to A. H. Bobeck on Oct. 13, 1970, describes means for controlling the propagation of domains such as those described above. In accordance with the principles of that invention, patterns (illustratively, alternating T and bar shapes as shown in FIGS. 5A through 5D of the above patent) of a magnetically soft substance are deposited, for example, on the surface of the domain medium. Domain attracting magnetic pole concentrations form at various locations in this pattern of magnetically soft material as a magnetic field applied to the device in the plane of the domain medium rotates, thereby causing incremental motion of domains in the medium.

These and other principles are employed by A. J. Perneski et al. in copending application Ser. No. 89,631, filed Nov. 16, 1970, in order to provide a buffer memory capable of storing and manipulating digital information coded as sequences of magnetic domains. Work of this nature illustrates a growing interest in employing magnetic domains for logical operations as well as for information storage and retrieval.

Several problems have been encountered by those attempting to design apparatus for processing information by the manipulation of magnetic domains. In most such systems the information to be processed is coded as the presence or absence of domains. These present and absent domains propagate through and interact within a maze defined, for example, by an overlay pattern of the type discussed in the above-mentioned Bobeck patent. The configuration of the maze, of course, determines the manner in which the information is processed. Designing such a maze is relatively difficult because information propagating therein must be carefully timed to insure that the intended interactions take place. It is also desirable to avoid having to create new domains and/or annihilate existing domains since such operations are generally wasteful of space and energy. In addition, initializing and clearing apparatus which processes information by propagating domains through a maze is difficult and time-consuming. Finally, because the technology of domain devices is in its infancy, there is an absence of standard, compatible logic components comparable to those available to designers of logic circuitry. This impedes the design of domain logic apparatus.

It is therefore an object of this invention to improve and simplify the design of magnetic domain logic devices generally.

It is a more particular object of this invention to provide a plurality of magnetic domain logic cells, each of which performs a relatively simple logic operation on information applied thereto, any number of which cells can be compatibly interconnected to realize any logic functions.

It is another object of this invention to provide means for realizing any magnetic domain logic apparatus without the necessity for the creation and/or annihilation of domains.

SUMMARY OF THE INVENTION

These and other objects of this invention are accomplished, in accordance with the principles of this invention, by a novel approach to the design of magnetic domain logic devices. More particularly, logic devices are realized as arrays of relatively simple cells which perform elementary logic functions (e.g., AND, OR, NAND, NOR, etc.) and elementary information transmission functions and between which cells information is transferred by the mechanism of mutual domain repulsion.

The cells, which are driven synchronously by a rotating or reorienting in-plane magnetic field, generally comprise overlay patterns defining at least two interconnected recirculating domain propagation loops. Information is output by a cell when a domain recirculating in the cell on a loop passing near an intercell boundary repels a domain recirculating in an adjacent cell. As a result of this repulsion, the domain in the adjacent cell is urged or deflected from the loop in which it normally recirculates to a second loop in the same cell where it continues to propagate either until deflected into yet another loop in the cell or until the second loop rejoins the first. Depending on the path thus taken by the recirculating domain, that domain either does or does not interact with domains recirculating in adjacent cells. The arrangement of the recirculating loops in a given cell determines the function performed by the cell. The orientation of cells in an array of cells determines the flow of information through the array. Finally, all cells have common timing properties and are synchronized in accordance with a common synchronization scheme. Accordingly, the design of complicated logic apparatus is greatly simplified.

Further features and objects of this invention, its nature, and various advantages, will be more apparent upon consideration of the attached drawing and the following detailed description of the invention.

BRIEF DESCRIPTION OF THE DRAWING

FIG. 7 is a schematic diagram of a domain propagating inverter or logical NOT cell constructed in accordance with the principles of this invention;

FIG. 8 is a schematic diagram of a crossover cell constructed in accordance with the principles of this invention;

FIG. 9 is a schematic diagram of a logical AND cell constructed in accordance with the principles of this invention;

FIG. 10 is a schematic diagram of a logical OR cell constructed in accordance with the principles of this invention;

FIG. 11 is a schematic diagram of a logical NAND cell constructed in accordance with the principles of this invention;

FIG. 12 is a schematic diagram of a logical NOR cell constructed in accordance with the principles of this invention;

FIG. 13 is a schematic diagram of a logical EXCLUSIVE OR cell constructed in accordance with the principles of this invention;

FIG. 14 is a schematic diagram of a bistable or flip-flop cell constructed in accordance with the principles of this invention;

DETAILED DESCRIPTION OF THE INVENTION

Figure 1D:
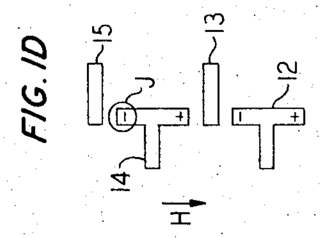
FIGS. 1A through 1D illustrate an overlay pattern which can be employed in conjunction with a reorienting in-plane magnetic field to controllably propagate magnetic domains in a suitable medium.
Figure 1C:
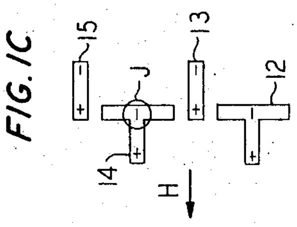
Figure 1B:
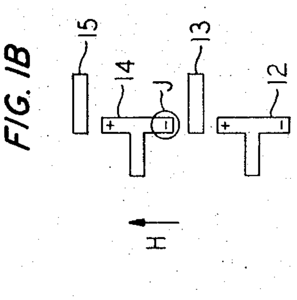
Figure 1A:
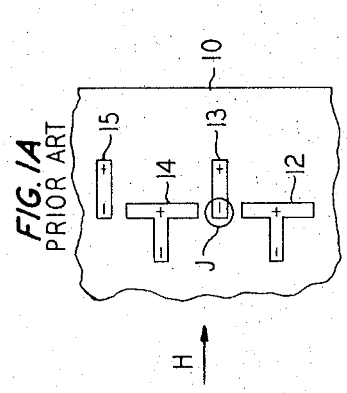
FIG. 1A PRIOR ART

In FIG. 1A, sheet 10 of magnetic domain propagating material has superimposed on it a magnetically soft overlay pattern of alternating T and bar shapes 12, 13, 14, and 15. Materials suitable for use in sheet 10 and in overlay shapes 12 through 15 and apparatus suitable for generating the fields required to establish and impel cylindrical domains in sheet 10 are discussed, for example, in U. S. Pat. No. 3,534,347, cited above. To review briefly the mechanism of domain propagation described in detail in that patent, drive field H, having the orientation indicated by the arrow in FIG. 1A, is applied in the plane of sheet 10. Field H induces positive and negative magnetic poles, as indicated by the plus and minus signs in FIG. 1A, at opposite ends of rectangular overlay shapes the long dimensions of which are aligned with field H, i.e., at opposite ends of the uprights of Ts 12 and 14 and at opposite ends of bars 13 and 15. No significant poles are induced in rectangular overlay shapes the long dimensions of which are not aligned with field H. Assuming that domains in sheet 10 are attracted by negative poles thus induced in the overlay, a representative domain, shown as circle J, occupies the position in sheet 10 shown in FIG. 1A, i.e., a position assumed to be directly under the negative pole at the left end of bar 13.

Domain J is made to move upward along a path defined by the overlay pattern of FIG. 1A by counterclockwise rotation of field H in the plane of sheet 10. In FIG. 1B, for example, field H is shown rotated 90 degrees from its orientation in FIG. 1A. The poles present in the overlay as shown in FIG. 1A are all accordingly neutralized and a new pole pattern established as shown in FIG. 1B. No longer attracted to its former position by bar 13, domain J moves in sheet 10 to the nearest domain attracting pole, i.e., to the negative pole at the lower end of the crosspiece of T 14. In response to a further 90° counterclockwise reorientation of field H, inducing the pattern of poles shown in FIG. 1C, domain J again moves upward in sheet 10 to the position of a negative pole at the center of T 14. Finally, another 90° counterclockwise reorientation of field H induces the pole pattern shown in FIG. 1D. Domain J responds by moving to the negative pole at the upper end of the crosspiece of T 14. It will be evident that yet another 90° counterclockwise reorientation of field H, restoring that field to the orientation shown in FIG. 1A, causes domain J to move from T 14 to a position on bar 15 entirely analogous to its earlier position on bar 13 in FIG. 1A. Accordingly, domain J moves one period along the repeating overlay pattern for each 360° rotation of the in-plane magnetic field H.

Figure 2B:
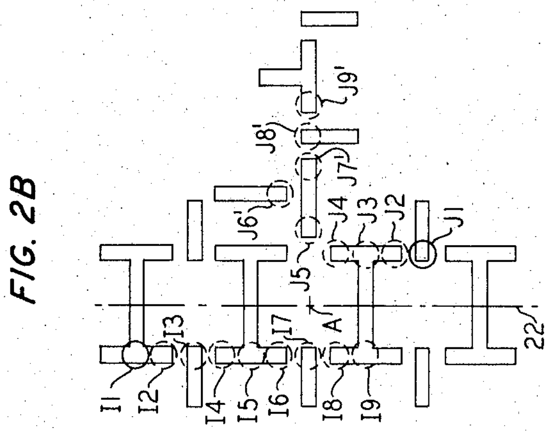
FIGS. 2A and 2B illustrate an overlay pattern which can be employed to transmit domain-encoded information across a boundary without the domains themselves crossing the boundary.
Figure 2A:
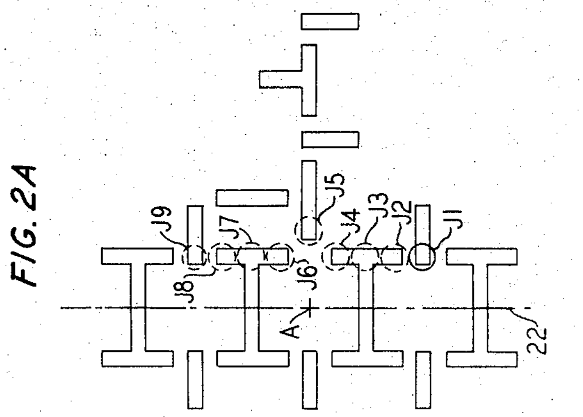

Each of FIGS. 2A and 2B, sometimes referred to herein as composite FIG. 2, shows an overlay pattern defining two domain propagation paths, each path being similar in operation to the domain propagating pattern described above. To the left of (imaginary) reference line or boundary 22 is a first path which, by virtue of being a mirror image of the path of FIG. 1A, propagates domains downwardly in response to a counterclockwise rotating in-plane field. To the right of boundary 22 is a second path which propagates domains upwardly in response to the same in-plane field. This second path branches at a point opposite reference point A, one branch path continuing upward parallel to boundary 22 while the other branch extends perpendicular to boundary 22 at point A. A domain propagating upwardly along the path to the right of boundary 22 normally follows the branch parallel to boundary 22. This behavior is illustrated by the motion of domain J in FIG. 2A which occupies positions J1, J2, J3, J4, etc. at successive quarter cycles in the counterclockwise rotation of the in-plane field.

Domain J can, however, be urged to take the perpendicular branch. Assume that domain I is at position I1 in FIG. 2B on the path to left of boundary 22 at the same time that domain J is at position J1. As the in-plane field rotates, domains I and J move along their respective paths toward reference point A. When domain I reaches position I5, domain J occupies position J5. Position J5 is the point at which the right-hand path branches. As domain I moves from position I5 to position I6 it exerts a repulsive magnetic force on domain J as domain J attempts to move from position J5 to position J6. This repulsion of nearby domains, often likened to the repulsion of like-charged pith balls (although the repulsive force is magnetic rather than electrostatic), is a phenomenon well known in domain technology (see, for example, U. S. Pat. No. 3,541,534, issued to U. F. Gianola et al. on Nov. 17, 1970). As a result of this repulsive force between domains I and J, domain J moves from position J5 to position J6′ rather than to position J6. This deflection of domain J does not occur without the presence of domain I because domain J, at position J5, is slightly closer to the domain attracting pole at position J6 than it is to the domain attracting pole of comparable strength at position J6′. With domain I present as shown in FIG. 2B, however, domain J prefers a position farther from domain I. It therefore moves into the path perpendicular to boundary 22 at points A, i.e., from position J5 to position J6′. Thereafter, domain J continues along the branch path perpendicular to boundary 22, moving to consecutive positions J7′, J8′, J9′, and so on.

Assume now that information is represented by the presence or absence of a domain (e.g., domain I) on the path to the left of boundary 22, and that this present or absent domain is synchronized with domain J on the path to the right of boundary 22. Clearly, the presence or absence of domain I and hence the information represented thereby can be detected from the subsequent presence or absence of domain J on the path perpendicular to boundary 22. Thus domain-encoded information can be transmitted across boundary 22 without the domains themselves crossing that boundary. Information crosses the boundary solely by the mutual repulsion of nearby domains. Because of the possibility of such domain interactions in the vicinity of reference point A, that point is conveniently referred to as an interaction point.

Figure 3:
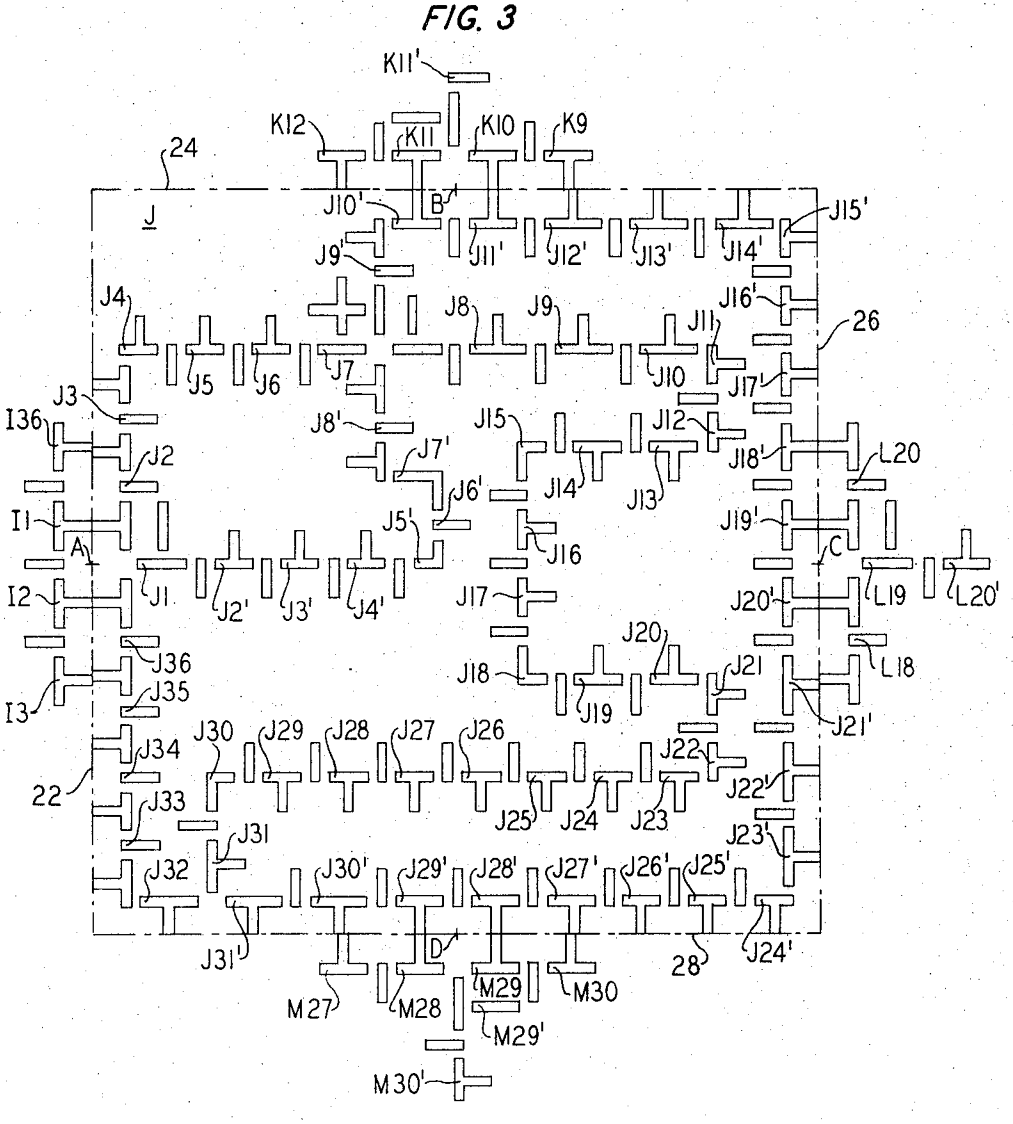
FIG. 3 is a detailed diagram of the overlay pattern in a transmission cell designed in accordance with the principles of this invention.

FIG. 3 illustrates a domain propagating overlay pattern employing the information transmission mechanism described above and further arranged in accordance with the principles of this invention. The portion of this overlay pattern enclosed by (imaginary) boundary lines 22, 24, 26, and 28 defines what will be referred to hereinafter as information transmission cell J. As shown in FIG. 3, the area associated with cell J is square in shape, the four sides of the square being bisected by (imaginary) reference points A, B, C, and D. Like point A in FIG. 2, points A, B, C, and D in FIG. 3 are all potential interaction points where domain-encoded information can cross the boundary of cell J by the domain interaction mechanism described above, i.e., without the domains themselves crossing the boundary of cell J.

Figure 4:
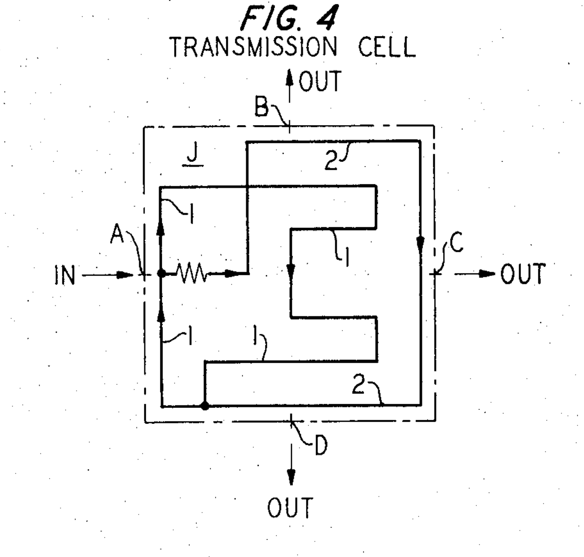
FIG. 4 is a schematic diagram of the cell of FIG. 3.

As is perhaps clearer from FIG. 4 wherein cell J is shown schematically, the overlay pattern of cell J defines two interconnected, recirculating, domain propagation loops 1 and 2. Where loops 1 and 2 diverge in the vicinity of interaction point A, the resistor-like line in loop 2 indicates that this is the alternative direction at the branch, i.e., that a domain propagating in the cell will pass point A on loop 1 unless deflected into loop 2 as discussed in detail below. The cell is arranged so that 36 counterclockwise rotations of the in-plane field are required to impel a domain in a complete circuit of cell J along either of these loops. This latter property of cell J is confirmed by an examination of the cell as shown in detail in FIG. 3.

It is first to be observed that in the vicinity of point A, the overlay pattern of FIG. 3 is identical to that shown in FIG. 2. Accordingly, there is a branching in connection of the loops in cell J opposite that point. Assume now that a domain J (not shown), permanently associated with (i.e., stored within) cell J, is at position J1 at the start of an assumed first counterclockwise rotation of the in-plane field. It will be apparent that at the start of the next such rotation of the in-plane field, domain J is either at position J2′ or J2 depending on whether or not a domain I passed point A on the path segment outside cell J during that first rotation of the in-plane field. If no interaction of domains takes place at interaction point A, domain J occupies position J2 at the start of this second rotation of the in-plane field. At the start of each successive rotation, domain J occupies the next identified position along the path identified as path 1 in FIG. 4.

Between positions J7 and J8 path 1 crosses path 2. At the crossover point, the overlay is designed in accordance with principles disclosed in U. S. Pat. No. 3,543,255, issued to R. H. Morrow et al. on Nov. 24, 1970. This crossover therefore permits a domain on either path to pass through the intersection without interference from domains, if any, passing through the intersection on the other path. It will be understood from the Morrow patent that an intersection of this type operates in part by exchanging one domain for another, thus requiring that an idle domain always be recirculating at the crossover point. Since this change in the identify of domains is unimportant in the present discussion, it will simply be assumed that during the course of one rotation of the in-plane field, domain J moves from position J7, through the crossover, to position J8. Thereafter, domain J continues along path 1 until, after 36 rotations of the in-plane field, it again occupies position J1.

If domain J is deflected into path 2 by an interaction at interaction point A, it follows path 2, occupying positions J2′, J3′, J4′, etc., at the start of successive rotations of the in-plane field until paths 1 and 2 rejoin just before position J32 is reached.

The significant difference between paths 1 and 2 is that domain J, circulating on path 2, passes sufficiently close to interaction points B, C, and D to permit interaction of domain J with each of domains K, L, and M (not shown) concurrently passing points B, C, and D, respectively, on the path segments outside cell J shown in FIG. 3. On path 1 domain J remains too far from the boundary of cell J to produce any such interactions. More particularly, nine rotations of the in-plane field after an interaction at point A (i.e., during rotation 10), domain J passes sufficiently close to point B on path 2 to permit an interaction between domains J and K. As the result of this interaction, domain K, propagating along a branching path entirely analogous to the branching interconnection of paths in cell J opposite point A, is urged to move from position K10 to K11′ rather than to position K11 as it would in the absence of domain J. Nine rotations after passing point B (i.e., during rotation nineteen), domain J passes sufficiently close to point C to permit a similar interaction there between domains J and L. Finally, nine rotations after passing point C (i.e., during rotation twenty-eight), domain J passes sufficiently close to point D to cause yet another similar interaction between domains J and M at that point. Accordingly, the logical or operational cycle of cell J, starting when domain J is at position J1 and including the subsequent 36 rotations of the in-plane field, may be thought of as divided into four operational quarter cycles, each requiring nine rotations of the in-plane field. With respect to cell J, an input interaction occurring at point A at the start of a first operational quarter cycle is followed by output interactions at any or all of points B, C, and D at the start of successive operational quarter cycles. Thus information applied to cell J as the presence of absence of domain I at point A at the start of any given logical or operational cycle of cell J is available at any or all of points B, C, and D as the presence or absence, respectively, of domain J at those points. This information is, of course, delayed one quarter, one half, and three quarter operational cycles, respectively, in reaching points B, C, and D. All that is required for the detection and continued propagation of this information is the presence of a domain on a branching path outside cell J synchronized to pass the given interaction point as domain J passes that point. These branching paths may be portions of the paths in cells adjacent to cell J.

As is suggested by the foregoing, cell J is designed so that any number of similar cells can be conveniently arranged in a matrix through which information propagates in response to the rotation of an in-plane field. The route or routes taken by information propagating in such a matrix depends on the orientation of the individual cells in the matrix, i.e., on the connectivity of the matrix. It is helpful to explain the synchronization of the cells in such a matrix before considering the other aspects of the design and operation of such a matrix.

Figure 5A:
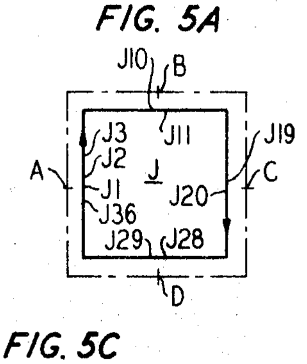
FIG. 5A is a schematic diagram of a cell of a type useful in understanding the synchronization of cells assembled in accordance with the principles of this invention.

Consider the simplified cell shown schematically in FIG. 5A. This extremely simple type of cell has a single domain propagating loop around the outer periphery of the cell. Accordingly, no meaningful (i.e., information propagating) interactions can occur between cells of this type. Cells of this type do serve, however, to illustrate the manner in which domains approach the four interaction points (points A, B, C and D) in cells generally. In order for interactions between adjacent cells to be possible, domains in the adjacent cells must pass the interaction point common to the cells simultaneously.

Figure 5B:
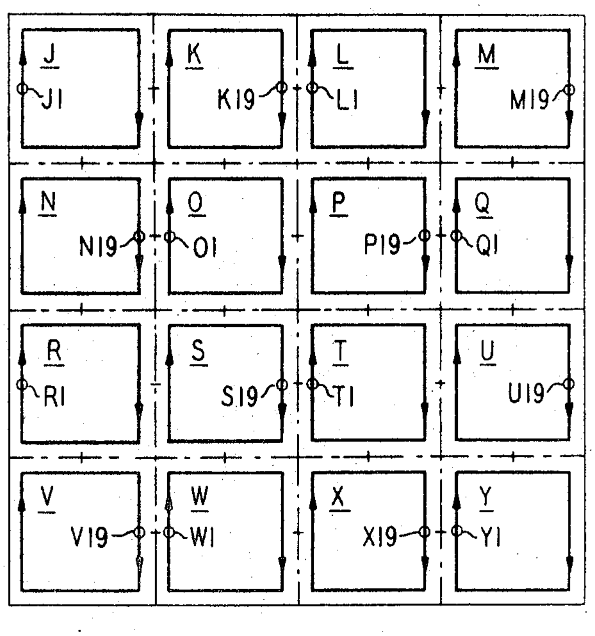
FIG. 5B is a matrix of cells of the type shown in FIG. 5A.

Now consider a matrix of cells of the type shown in FIG. 5A. Such a matrix is shown in FIG. 5B. All of cells J through Y, having association with them recirculating domains J through Y, respectively, have the same orientation as cell J in FIG. 5A. That is, in each cell, domain position 1 is near the middle of the lefthand edge of the cell while domain position 19 is near the middle of the opposite (righthand) edge of the cell as viewed in the Figure. All domains recirculate in their respective cells in a clockwise direction, requiring 36 rotations of the same counterclockwise-rotating in-plane field to complete one circuit of the associated cell.

Interactions occur at all interaction points in the matrix of FIG. 5B (though again no information is exchanged by the cells) if at some arbitrary starting time the domains occupy the positions identified in FIG. 5B. This can be seen by considering any cell in the matrix, for example, cell O. Initially, an interaction takes place between cells O and N as domains O and N move from starting positions O1 and N19, respectively. One operational quarter cycle later, cell O interacts with cell K at the interaction point common to cells O and K, domain K having reached that point from initial position K19 at the same time domain O arrives from initial position O1. One operational quarter cycle after the interaction with cell K, cell O interacts with cell P, domains O and P having each completed a half circuit of their respective cells from initial positions O1 and P19. Finally, one operational quarter cycle after the interaction between cells O and P, cell O interacts with cell S at the interaction point common to cells O and S, domains O and S having each progressed three space quarters of the way around their respective cells from initial positions O1 and S19. At the start of its next circuit of cell O, domain O is again in position to interact with domain N. The succession of interactions described above accordingly continues.

From the matrix of FIG. 5B it will be apparent that interactions occur throughout a matrix of cells of the type described herein if the domains are initially positioned in the cells as generally illustrated in FIG. 5B, i.e., if domains in adjacent cells are initially a half cycle or 180° out of phase with one another. Again taking the example of cell O in FIG. 5B, while domain O is initially at position 1 in cell O, domains N, K, P, and S in adjacent cells N, K, P, and S are all initially at positions 19. This relative positioning of domains in these cells leads to the characterization of cell O as a half cycle or 180° out of phase with cells N, K, P, and S. Cells N, K, P, and S, on the other hand, are all in phase with one another. Extending this phase relationship between adjacent cells throughout the matrix of FIG. 5B leads to the checkerboard pattern of FIG. 5C in which unshaded cells have the same phase as cell O while shaded cells have the same phase as cells N, K, P, and S. Since all cells have a common logical or operational cycle time, this pattern of phase relationships, once established, continues indefinitely. The checkerboard pattern of cell synchronization illustrated by FIG. 5C applies to all matrices of cells constructed according to the principles of this invention, whether made up of the transmission cells described above or any of the other types of cells described below and regardless of the orientation (i.e., connectivity) of the cells.

This last concept, the concept of orientation or connectivity of cells, also requires elaboration. Consider the matrix of cells shown schematically in FIG. 6. Cells I and O are dummy cells, i.e., areas not of interest in the immediate discussion. The remaining cells are all transmission cells identical to the cell of FIGS. 3 and 4. These transmission cells are arranged (i.e., oriented) so that information applied to the matrix at interaction point A is subsequently available at interaction points B, C, and D. An interaction at point A deflects domain L, not shown but assumed to be recirculating in cell L, into path 2 of cell L. One half operational cycle later, domain L passes the interaction point common to cells L and M at the same time that domain M, similarly assumed to be recirculating in cell M in the appropriate phase relationship to the recirculation on domain L in cell L, passes that point. The resulting interaction deflects domain M into path 2 of cell M. A quarter operational cycle after the interaction between cells L and M, domain L passes the interaction point common to cells J and M. Simultaneously, domain J, assumed to be recirculating in cell J in appropriate phase relationship, also passes the interaction point common to cells J and M. Since cell J has an orientation which permits it to receive information from cell M (i.e., cell J is oriented 90° counter-clockwise with respect to cell M so that the input interaction point of cell J is coincident with the upper output interaction point of cell M), the resulting interaction of domains J and M deflects domain J into path 2 of cell J. Three quarters of an operational cycle after this interaction between cells J and M, domain J passes the interaction point common to cells J and K. This coincides with the passage of domain K, assumed to be recirculating in cell K in appropriate phase relationship to cell J. Cell K being oriented to receive information from cell J, the resulting interaction of domains J and K deflects domain K into path 2 of cell K. One half operational cycle later the presence of domain K can be detected at point B.

Subsequent to the above-described interaction between cells M and J, domain M continues along path 2 in cell M, passing the interaction point common to cells M and N one quarter operational cycle later. At that time, cells M and N interact in the manner of the earlier interaction between cells L and M, thereby deflecting domain N, assumed to be recirculating in cell N into path 2 of cell N. One half operational cycle later, the presence of domain N can be detected at point C. Domain M moves from the above interaction of cells M and N to produce an interaction between cells M and P at the interaction point common to those cells. Because of the orientation of cell P (i.e., rotated 90° clockwise relative to the orientation of cell M), the interaction between cells M and P deflects domain P, assumed to be recirculating in cell P in the appropriate phase relationship to cell M, into path 2 of cell P. One operational quarter cycle later, domain P interacts with domain Q at the interaction point common to cell P and appropriately synchronized cell Q, thereby deflecting domain Q into path 2 of cell Q. One half operational cycle later the presence of domain Q on path 2 can be detected at point D.

Although cells K and N and cells N and Q have interaction points in common and although domains can pass close enough to one another in these cells to cause interactions at these points, such interactions occur without influencing domain propagation in either interacting cell. This is, of course, because neither cell involved in these interactions is oriented to accept information from the other cell, i.e., neither cell has a branching interconnection of loops in the vicinity of the common interaction point. Accordingly, these interactions are of no consequence and can be ignored.

In the absence of an input interaction at point A, none of the above described interactions occur and none of domains K, N, or Q are subsequently detected at points B, C, and D.

Figure 6:
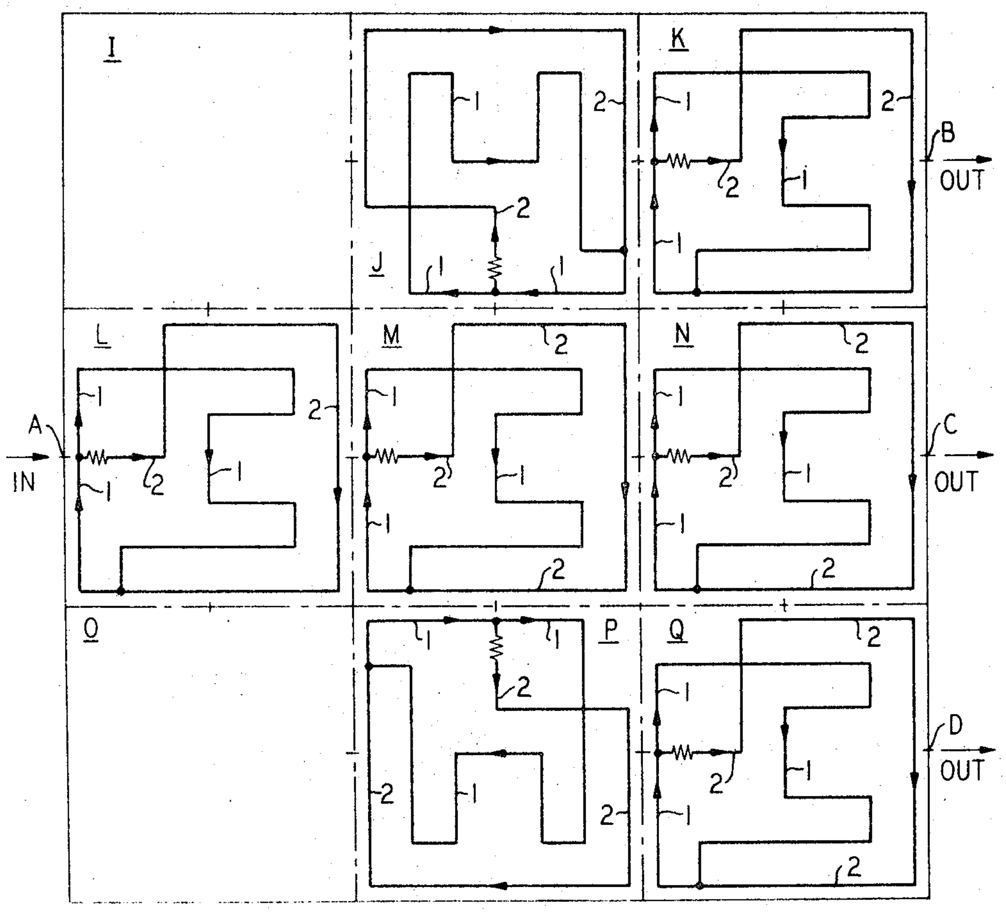
FIG. 6 illustrates a matrix of cells of the type shown in FIGS. 3 and 4.

Information can, of course, be applied to the matrix of FIG. 6 either by domain interactions at input point A or by any other controllable local domain repelling field in the vicinity of input point A (i.e., an input transducer). An example of the latter is an appropriately pulsed wire perpendicular to the plane of the overlay at point A. Similarly, information propagated by the matrix of FIG. 6 can be detected by further domain interactions at points B, C, and/or D or by optical or electrical detection of domains K, N, and/or Q as they pass any of these points on path 2 in their respective cells.

Two things are to be observed about the illustrative matrix of transmission cells shown in FIG. 6. The first is that the checkerboard phase relationship between cells described above in connection with FIG. 5C applies to this matrix and insures that all adjacent cells are synchronized for interactions at all common interaction points. The second thing to be observed is that which of these interactions is meaningful (i.e., which result in the transmission of information between cells) depends on the orientation of the cells involved in the interaction. Any cell in such a matrix can, of course, have any orientation. The path or paths taken by information propagating through the matrix is entirely determined by the orientation of particular cells in the matrix. In the matrix of FIG. 6, for example, cell M propagates information applied to it in three separate directions because cells J, N, and P are all oriented to receive information from it. Cell N, on the other hand, propagates information applied to it in only one direction, because neither of cells K or Q has an orientation permitting them to be responsive to cell N. Thus a multiplicity of information propagation paths is possible in a matrix of transmission cells.

FIG. 7 illustrates a cell, arranged in accordance with the principles of this invention, in which the roles of paths 1 and 2 are reversed relative to the roles of paths 1 and 2 in the transmission cell of FIGS. 3 and 4. In describing this and other types of cells hereinafter, only the macroscopic features of the cells will be discussed, it being clear at this point how overlay patterns can be arranged to realize the domain propagation paths required in each type of cell. Moreover, it will be assumed that all cells have a common logical or operational cycle time (e.g., thirty-six rotations of the in-plane field) and that interactions occur, at least potentially, in successive operational quarter cycles at interaction points ordered clockwise around the periphery of the cells.

In the cell of FIG. 7, an associated domain (not shown) recirculates on path 1 unless deflected into path 2 by an input interaction at point A. Accordingly, the cell of FIG. 7 operates as an inverter, providing a domain on path 1 for output interactions at any or all of output interaction points B, C, and D except during cycles in which an input interaction deflects the recirculating domain into interior path 2. Since the timing properties of cells of this type are in all respects similar to the transmission cell of FIGS. 3 and 4, cells of this type can be included anywhere in a matrix of transmission cells to invert information propagating therein.

FIG. 8 illustrates another useful type of cell. Domain interaction at either of input interaction points A and B permits an output interaction one half operational cycle later at the opposite output interaction point (i.e., at interaction points C and D, respectively). The cell of FIG. 8 therefore allows information propagating on two intersecting paths in a cell matrix to cross.

The crossover cell of FIG. 8, though generally arranged in accordance with principles already discussed, has some unique features requiring further elaboration.

Not counting domains idling at the four intersections of paths 2 and 4, the crossover cell has at least two domains recirculating therein, one associated with interconnected loops 1 and 2 and the other associated with interconnected loops 3 and 4. Again ignoring changes in domain identity occurring at the four internal path intersections, these two pairs of interconnected loops operate independently of one another. The domain associated with loops 1 and 2 recirculates in loop 1 until deflected into loop 2. Once in loop 2, that domain crosses to the opposite (output) side of the cell where it is available for interaction with a domain at point C in an adjacent cell. Thereafter it returns along loop 2 to the junction of loops 1 and 2. Similarly, the domain associated with loops 3 and 4 normally recirculates in loop 3 until deflected into output loop 4. That domain then crosses the cell to the opposite (output) side for interaction with a domain at point D in an adjacent cell and then returns to reenter loop 3. As will be observed, "no-output" loops 1 and 3 are considerably shorter than "output" loops 2 and 4. The latter loops must, of course, be such that thirty-six rotations of the in-plane field are required to impel domains propagating therealong from the associated input interaction point to the associated output interaction point and back again. No-output loops 1 and 3, however, can be such that two or more circuits or traverses thereof are made in each logical cell cycle as long as domains recirculating therein arrive at the associated input interaction points at the appropriate times. Accordingly, loops 1 and 3 can be made considerably shorter than loops 2 and 4.

While the transmission cell of FIGS. 3 and 4 and the crossover cell of FIG. 8 are useful for propagating information in a matrix of cells, the inverter cell of FIG. 7 illustrates a cell which performs an elementary logic function (i.e., inversion or logical NOT). FIGS. 9 through 14 illustrate other logic cells (i.e., AND, OR, NAND, NOR, EXCLUSIVE OR, and flip-flop cells, respectively) which can be constructed in accordance with the principles of this invention. All of these cells operate compatibly with one another and with the transmission, inverter, and crossover cells described above. Thus, as will be discussed in greater detail below, any of the cells described herein can be arranged in any manner to form matrices of cells capable of performing any logical operation possible with comparable logic circuit devices. First, however, each of the cells in FIGS. 9 through 14 must be described.

FIG. 9 illustrates a cell, constructed according to the general principles discussed above, which operates as a two-input AND gate. Accordingly, an output interaction is possible only after input interactions have occurred at each of two input interaction points. The domain associated with the AND cell of FIG. 9 normally recirculates on path 1. An input interaction at input interaction point A, however, deflects the recirculating domain into path 2 which allows that domain to pass input interaction point B. If no input interaction occurs at B, the domain returns to path 1 along the remainder of path 2. An input interaction at point B, on the other hand, deflects the domain into path 3, thereby allowing it to pass output interaction point C. Thereafter, path 3 rejoins path 1.

The timing of this cell is completely consistent with the timing of all other cells. One logical or operational cycle is required for the associated domain to complete a circuit of the cell along any path or combination of paths. In addition, one half operational cycle after deflection into path 2 at input point A, the recirculating domain passes input point B. If deflected into path 3 at point B, the recirculating domain passes output point C one quarter operational cycle after that. It will be evident from the foregoing that the logical cycle of the AND cell of FIG. 9 begins as the associated domain passes input interaction point A.

FIG. 10 illustrates a two-input logical OR cell also constructed according to the principles of this invention. As an OR cell, the cell of FIG. 10 allows an output interaction at its output interaction point after input interactions at either or both of its two input interaction points. Normally, the domain associated with this cell recirculates on path 1. It can be deflected into output path 2 by interactions at either of input interaction points A and B. Three quarters of an operational cycle after being deflected into path 2 at interaction point A or one quarter of an operational cycle after being deflected into path 2 at interaction point B, the recirculating domain passes output interaction point C. Thereafter, the domain returns to path 1 along the remainder of path 2, arriving at input interaction point A one quarter of an operational cycle after passing output point C. Like the AND cell of FIG. 9, the logical cycle of the OR cell of FIG. 10 begins as the recirculating domain reaches input interaction point A.

The cell of FIG. 11 is a two-input logical NAND cell constructed in accordance with the principles of this invention. As such, an output interaction takes place at its output interaction point except during logical cycles in which input interactions take place at each of its two input interaction points. Normally, the domain associated with the NAND cell of FIG. 11 recirculates on output path 1. An input interaction at point A deflects the recirculating domain into path 2 which takes it past input interaction point B one half operational cycle thereafter. Unless an input interaction also occurs at input point B, the domain remains in path 2, rejoining path 1 and passing output point C one quarter operational cycle later. If, on the other hand, an input interaction does occur at point B, the domain is deflected into path 3 which by-passes output point C, returning the domain to path 1 farther along that path. Like the cells of FIGS. 9 and 10, the logical cycle of the NAND cell of FIG. 11 begins as the recirculating domain reaches input interaction point A.

FIG. 12 illustrates a two-input logical NOR cell constructed according to the principles of this invention. An output interaction takes place at the output interaction point of this cell unless an input interaction has occurred at either of the two input interaction points. The domain associated with the NOR cell of FIG. 12 normally recirculates on output path 1, passing output point C in each logical cycle unless deflected into path 2 by an input interaction at either of input points A and B. As in the cells of FIGS. 9 through 11, one logical or operational cycle is required for the associated domain to complete a circuit of the NOR cell on any path or combination of paths. A logical cycle for the NOR cell begins as the recirculating domain reaches input point A. If no interaction takes place at that point, the domain continues along path 1 passing input point B one half operational cycle later. If no interaction takes place at input point B, the domain passes output point C one quarter operational cycle after that.

FIG. 13 illustrates a two-input EXCLUSIVE OR cell constructed in accordance with the principles of this invention. As a two-input EXCLUSIVE OR gate, the cell of FIG. 13 allows an output interaction to take place in response to an input interaction associated with either, but not both, of its input points. At the start of a logical cycle of the cell of FIG. 13, the associated recirculating domain passes input point A. Unless an input interaction takes place at point A, the domain continues along path 1, reaching input point $B_1$ after a quarter of an operational cycle. Unless an input interaction occurs at point $B_1$, the domain remains in path 1 returning to input point A at the start of the next logical cycle. If, however, an input interaction occurs at input point A, the recirculating domain is deflected into path 2 which takes it past input point $B_2$ (logically the same variable as is applied to the cell at input point $B_1$) half an operational cycle later. Unless an input interaction also takes place at input point $B_2$, the domain continues along path 2, past output point C a quarter operational cycle later, and finally back to path 1. An input interaction at point $B_2$, on the other hand deflects the domain directly back into path 1, thereby by-passing output interaction point C.

An output interaction will also occur in the absence of an input interaction at point A if warranted by the logical condition of variable B. In that event, the recirculating domain passes point A on path 1, reaching point $B_1$ a quarter operational cycle later. At that point, an input interaction deflects the domain into path 3 which rejoins path 2 at some point before that path passes output point C. One half operational cycle is required, of course, for the domain to reach output point C from input point $B_1$.

A final illustrative logic cell is shown in FIG. 14. The cell shown in that Figure is a bistable or flip-flop cell. Until deflected into path 2 by a SET interaction at input point A, the domain associated with this cell recirculates on interior path 1. Accordingly, no output interactions occur at output interaction point C. Once deflected into path 2, however, the domain remains on that path until the cell is reset by a RESET interaction at input point B. While the cell of FIG. 14 is set, output interactions occur at output interaction point C. The cell is arranged so that interactions occur at point A at the start of a logical cell cycle, at point B half way through a logical cell cycle, and at point C three quarters of the way through a logical cell cycle.

The transmission and logic cells thus far described are, of course, merely illustrative of the cells which can be constructed by application of the principles of this invention. Other cells, useful in certain special situations, may be implemented by those skilled in the art without departing from the scope and spirit of the invention.

Figure 15:
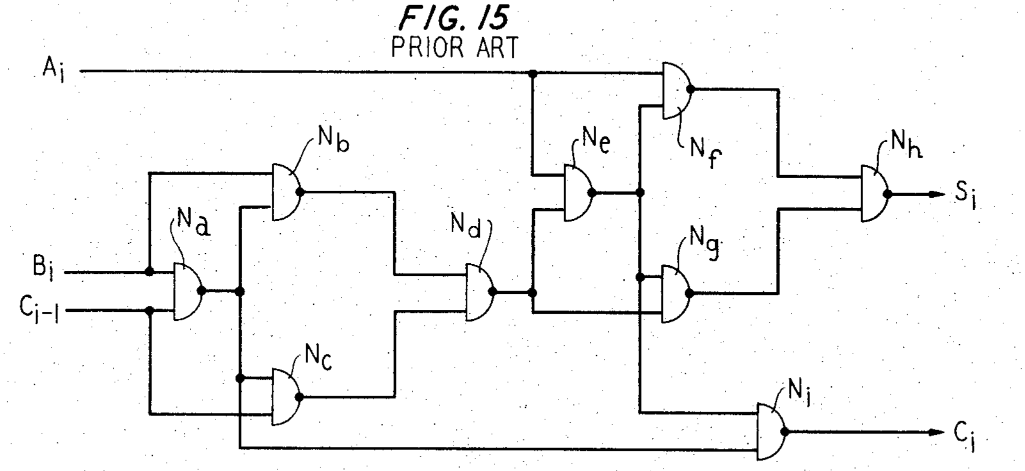
FIG. 15 PRIOR ART
FIG. 15 is a schematic diagram of a well-known binary full adder.
Figure 16:
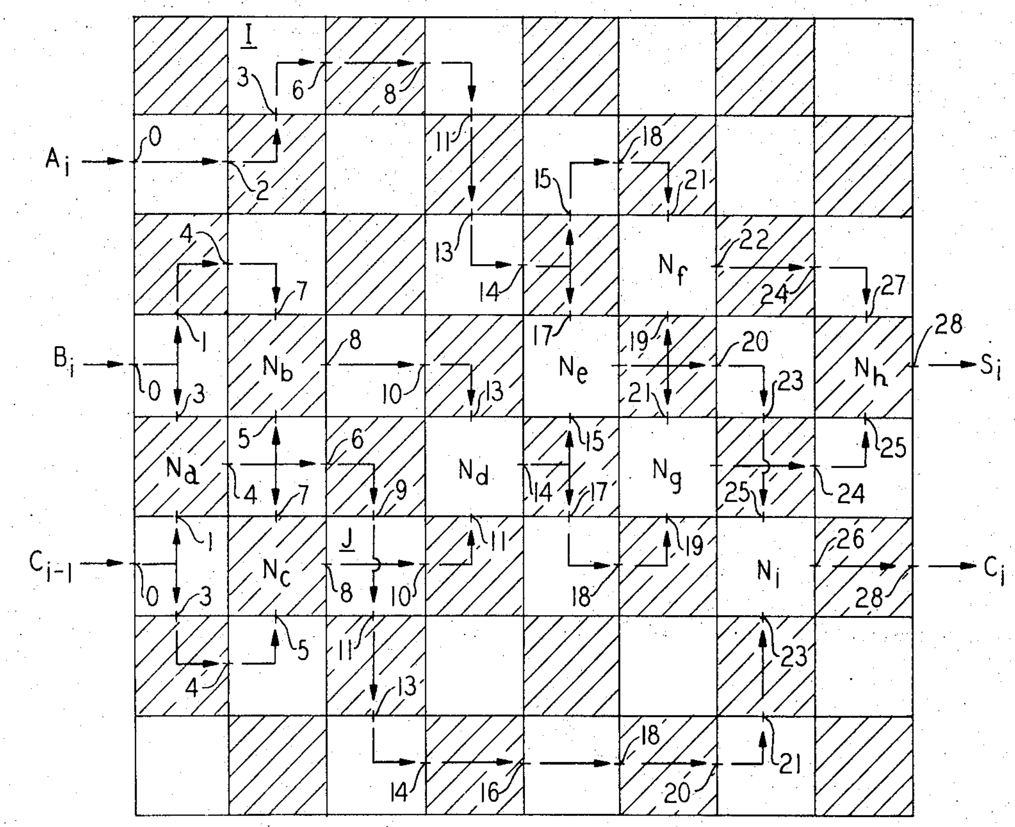
FIG. 16 is a schematic diagram of a full adder like the one shown in FIG. 15 but constructed in accordance with the principles of this invention using the domain logic cells described herein.

It is contemplated, of course, that these and other cells will be used together to form apparatus for logical manipulation and transmission of domain-encoded digital information. FIG. 15, for example, is a schematic diagram of a well-known binary full adder using only NAND gates. This apparatus adds the $i^{th}$ binary place of quantities A and B taking into account carry $C_{i-1}$ from the next lower order place to produce the $i^{th}$ place of the binary sum S and carry $C_i$ to the next higher order place. Nine two-input NAND gates, designated $N_a$ through $N_i$, are connected as shown in FIG. 15 to perform this function. FIG. 16 illustrates how the full adder of FIG. 15 can be implemented according to the principles of this invention by means of a matrix of transmission, crossover, and logical NAND cells such as those described above.

In the matrix of FIG. 16, each square area represents a cell. Alternate cells are shaded to show the phase relationship between the cells (e.g., shaded cells can be thought of as being 180° out of phase with unshaded cells). As mentioned, three types of cells are used in the matrix of FIG. 16. Transmission cells (e.g., cell I), having one input and from one to three outputs, are represented by arrows inside the cell leading from the input interaction point to the one or more output interaction points where interactions are actually to take place. These cells have various orientations as will be obvious from the arrows shown therein. Crossover cells (e.g., cell J), having two inputs and two outputs are represented by two crossing arrows, each leading from an input point to the associated output point. Logical NAND cells, identified $N_a$ through $N_i$, correspond in function to NAND gates $N_a$ through $N_i$ in the logic circuit of FIG. 15, respectively. All of NAND cells $N_a$ through $N_i$ are oriented with their output interaction points to the right. Other squares, both shaded and unshaded, represent cell locations not used in implementing the full adder device. Interaction points at which interactions can actually occur are numbered (from 0 through 28) not to identify them but rather to show the order and timing of interactions occurring at those interaction points. These numbers relate interactions taking place in the adder to the time at which data is applied to the adder in terms of logical or operational quarter cycles of the individual cells. Thus $A_i$, $B_i$, and $C_{i-1}$ are simultaneously applied to the adder at the input points designated 0. Twenty-eight operational quarter cycles later output interactions (or noninteractions) indicative of $S_i$ and $C_i$ take place at the output interaction points designated 28. The remaining numbers confirm the relative phasing of the individual cells and also confirm that data is applied to each NAND cell in a predetermined logical cycle of that cell. All cells, of course, operate in response to the same counterclockwise-rotating in-plane magnetic field.

The adder of FIG. 16 illustrates several of the important advantages of the cellular logic of this invention as are consistent with the objects stated above. Once satisfactory cells have been designed, they can be arrayed to realize any information processing apparatus without further regard for the problems associated with domain manipulation. Schematic diagrams of complicated logic devices can be translated directly into matrices of cells, it being necessary only to time interactions so that information is applied to cells (particularly logic cells) at appropriate times. Even this is made relatively simple by the common timing properties of all the cells. In addition, the cellular logic of this invention avoids the use of domain sources and domain sinks. No domains need ever be created or destroyed in logic apparatus designed in accordance with the principles of this invention. Domains present in the cells when the device is manufactured remain forever in synchronous recirculation in the cells.

Figure 17:
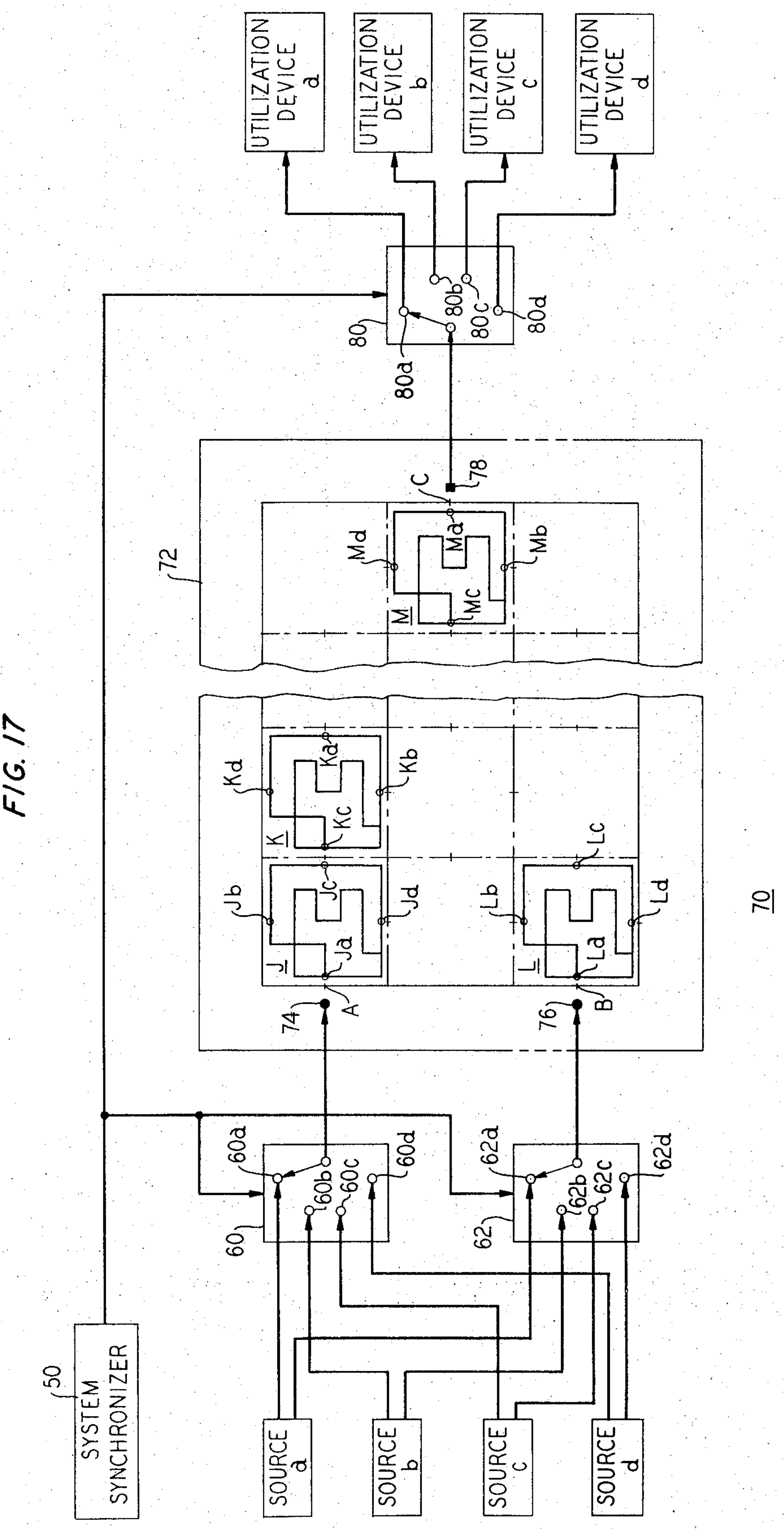
FIG. 17 is a schematic diagram of time multiplexed cellular domain logic apparatus constructed in accordance with the principles of this invention.

By associating more than one domain with each of the cells in domain logic apparatus constructed in accordance with the principles of this invention, time-division multiplexed data from several sources can be processed simultaneously on a time-shared basis with no increase in the time required for the operation or operations performed. FIG. 17, for example, illustrates cellular magnetic domain logic apparatus 70 including a matrix of cells (e.g., transmission cells J, K, L, and M) for performing a logical operation on two variables from each of four sources *a* through *d* to produce one variable for use in each of four corresponding utilization devices *a* through *d*. It will be understood that the apparatus of FIG. 17 is merely illustrative of the principles of this invention and that apparatus for processing any number of variables from any number of sources can be readily constructed by application of these principles.

In the apparatus of FIG. 17, each cell in domain logic apparatus 70 has associated with it four magnetic domains designated by the capital letter used to identify the cell and subscripts *a* through *d*. Thus, for example, the four domains associated with cell J are designated $J_a$ through $J_d$. Although it is not necessary that this be the case, the four domains associated with each cell in domain logic apparatus 70 are positioned equidistantly around the domain propagating loops defining the associated cell. Thus in cell J, for example, while domain $J_a$ is at the position corresponding to position J1 shown in FIG. 3, domains $J_b$, $J_c$, and $J_d$ are at positions corresponding to positions J10 (or J10′), J19 (or J19′), and J28 (or J28′), respectively.

Figure 5C:
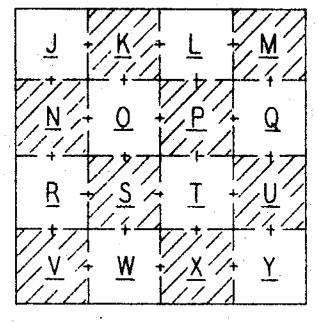
FIG. 5C is a diagram illustrating the required phase relationships between cells in the matrix of FIG. 5B and in matrices of cells generally.

The phasing of adjacent cells in the matrix of domain logic apparatus 70 is such that like-subscripted domains (e.g., domains $J_c$ and $K_c$ in cells J and K) can interact at the interaction point common to the cells, assuming one of the adjacent cells is oriented to receive information from the other. As can be seen from the relative positions of domains in cells J and K in FIG. 17, the 180° phase relationship discussed above applies for all like-subscripted domains in adjacent cells in this apparatus. Accordingly, the checkerboard phase diagram of FIG. 5C is equally applicable to time-shared cellular domain logic apparatus.

Each of sources *a* through *d* generates electrical signals, for example, representative of successive binary places of each of two variables. The signals representative of a first of these variables are applied to terminals 60*a* through 60*d*, respectively, of commutator or time multiplexer 60 while the signals representative of the second variable are applied to terminals 62*a* through 62*d*, respectively, of commutator or time multiplexer 62. Responsive to signals from system synchronizer 50, each of multiplexers 60 and 62 sequentially connects terminals 60*a* through 60*d* and 62*a* through 62*d* with input transducers 74 and 76, respectively. Input transducers 74 and 76 may be any devices for generating a domain repelling field at input interaction points A and B, respectively, and thereby determining the paths taken by domains recirculating in cells J and L in successive logical or operational cycles of those cells. Suitable transducer apparatus is discussed above in connection with FIG. 6.

Sources *a* through *d* and multiplexers 60 and 62 are synchronized with cellular logic apparatus 70 so that as domains recirculating in cells J and L pass input interaction points A and B, transducers 74 and 76 are connected through multiplexers 60 and 62 to the source having the same designation as the subscript of the passing domain. Thus signals representative of one binary place of the two variables originating with source *a* are applied to transducers 74 and 76 as domains $J_a$ and $L_a$ pass input interaction points A and B, respectively. That signal information, of course, determines which paths are taken by domains $J_a$ and $L_a$ in their subsequent recirculation of cells J and L. Subsequently, signals representative of one binary place of the two variables generated by source *b* are applied to transducers 74 and 76 as domains $J_b$ and $L_b$ pass input interaction points A and B. Thereafter, similarly synchronized connections are made to sources *c* and *d* after which the process is repeated beginning with source *a*.

As is generally true of time-shared apparatus, cellular domain logic apparatus 70 performs the operation it is designed to perform on data from each of sources *a* through *d*, that operation being performed by the propagation of interactions (or noninteractions) between correspondingly subscripted domains. Thus in successive logical cycles of cell J, domain $J_a$, for example, either does or does not interact with domain $K_a$ depending on the path taken by domain $J_a$. On that basis domain $K_a$ either does or does not interact with like-subscripted domains recirculating in one or more cells adjacent to it. This process continues until domain $M_a$ recirculating in cell M, either does or does not pass output interaction point C as determined by the operation performed by cellular logic apparatus 70 and the data applied thereto. At output interaction point C output transducer 78 detects the presence or absence of domain $M_a$, converting that information to signals which are applied by way of demultiplexer 80 to utilization device *a*. Concurrently, data from sources *b*, *c*, and *d* is also being processed, the presence or absence of domains $M_b$, $M_c$, and $M_d$ being similarly detected by transducer 78. The signal information thus generated by transducer 78 is applied to the appropriate utilization device by demultiplexer 80. Suitable output transducers are discussed above in connection with FIG. 6. Demultiplexer 80, similar to multiplexers 60 and 62, is similarly responsive to synchronizing signals from system synchronizer 50.

It will be evident from the foregoing that by associating *n* domains with each cell of domain logic apparatus constructed in accordance with the principles of this invention, data from as many as *n* sources can be processed by that apparatus on a time-shared basis with no increase in the required processing time. As a consequence, the efficiency with which the apparatus is utilized is greatly enhanced.

It is to be understood that the embodiments shown and described herein are illustrative of the principles of this invention only and that modifications may be implemented by those skilled in the art. For example, the particular means by which domains propagate in the cells shown and described herein is illustrative only and other means may, of course be employed. In addition, although domains recirculate in the particular cells described above in response to thirty-six rotations of the in-plane field, any other number of rotations may be used and cells of any size designed. Moreover, the principles of this invention are applicable to the design of larger and more complicated cells and to apparatus comprising cells of varying size. It will be understood that the principles of this invention are also applicable to the design of large and complex magnetic domain systems (e.g., computer and telephone switching systems) to solve the timing and sequencing problems arising when large numbers of domain interactions, each dependent on previous interactions, are required. In particular, cells on the scale of system components for such systems can be constructed and arranged in accordance with the principles of this invention. Finally, although square cells have been illustrated herein, other generally regular of equilateral shapes may, of course, be employed, interactions taking place between cells in the manner described herein.

What is claimed is:

1. Magnetic domain logic apparatus including a sheet of material in which single wall magnetic domains can be moved and a magnetically soft overlay pattern juxtaposed with a surface of said sheet characterized in that said overlay pattern defines at least two logic cells, each of said cells including at least two closed interconnected domain recirculating loops, said overlay pattern being further arranged so that at least one but not all of said loops in a first of said cells passes in proximity to a branching interconnection of said loops in a second of said cells.

2. The apparatus defined in claim 1 further characterized in that a domain recirculating in said second cell propagates along a first loop in said second cell unless deflected into a second loop in said second cell at said branching interconnection by the presence of a domain recirculating in said first cell on said loop passing in proximity to said branching interconnection.

3. Magnetic domain logic apparatus including a sheet of material in which single wall magnetic domains can be moved and a magnetically soft overlay pattern juxtaposed with a surface of said sheet characterized in that said overlay pattern defines at least two logic cells between which cells information propagates by the selective interaction of domains, at least one of which is permanently stored within one of said cells.

4. The apparatus defined in claim 3 further characterized in that the overlay pattern defining each of said cells further defines at least two closed interconnected domain recirculating loops.

5 Magnetic domain logic apparatus including a sheet of material in which single wall magnetic domains can be moved and a magnetically soft overlay pattern juxtaposed with a surface of said sheet characterized in that said overlay pattern defines a matrix of logic cells between which cells information propagates by the selective mutual repulsive interaction of domains, at least one of which is permanently stored within one of said cells.

6. The apparatus defined in claim 5 further characterized in that the overlay pattern defining each of said cells further defines at least two interconnected domain recirculating loops.

7. The apparatus defined in claim 6 further characterized in that each of said cells occupies an equilateral area in said overlay pattern.

8. The apparatus defined in claim 7 further characterized in that each of said cells has information propagating domain interaction points in common with adjacent cells at the midpoints of at least two of its sides.

9. The apparatus defined in claim 8 further characterized in that said recirculating loops in each of said cells branch in the vicinity of at least one of said information propagating domain interaction points.

10. The apparatus defined in claim 9 further characterized in that at least one of said recirculating loops in each of said cells passes near an information propagating domain interaction point while at least one other loop does not.

11. Magnetic domain logic apparatus including a sheet of material in which single wall magnetic domains can be moved, a magnetically soft overlay pattern juxtaposed with a surface of said sheet, and means for applying a reorienting magnetic field in the plane of said sheet characterized in that said overlay pattern defines a matrix of logic cells between which cells information propagates by the selective interaction of domains, at least one of which is permanently stored within one of said cells.

12. The apparatus defined in claim 11 further characterized in that the overlay pattern defining each of said cells further defines at least two interconnected domain recirculating loops.

13. The apparatus defined in claim 12 further characterized in that each of said cells occupies an equilateral area in said overlay pattern.

14. The apparatus defined in claim 13 further characterized in that each of said cells has information propagating domain interaction points in common with adjacent cells at the midpoints of at least two of its sides.

15. The apparatus defined in claim 14 further characterized in that said recirculating loops in each of said cells branch in the vicinity of at least one of said information propagating domain interaction points.

16. The apparatus defined in claim 15 further characterized in that said domain associated with each of said cells propagates along a first of said loops unless deflected into a second of said loops by interaction with a domain recirculating in an adjacent cell.

17. The apparatus defined in claim 16 further characterized in that at least one of said recirculating loops in each of said cells passes near an information propagating domain interaction point while at least one other loop does not.

18. Logic apparatus including a sheet of material in which single wall magnetic domains can be made to move comprising:

first domain recirculating means for selectively propagating a first domain along first or second closed paths in said sheet; and second domain recirculating means for propagating a second domain along third or fourth closed paths in said sheet in response to the propagation of said first domain along said first or second paths, respectively.

19. The apparatus defined in claim 18 wherein said first and second domain recirculating means respectively comprise first and second magnetically soft overlay patterns juxtaposed with a surface of said sheet.

20. Apparatus for performing binary logical operations by the propagation and interaction of magnetic domains in a magnetic domain medium comprising at least two logic cells, said cells being disposed so that binary information is transmitted between them by the mutual repulsion of domains synchronously recirculating in each of said cells, each of said cells further comprising at least two interconnected recirculating domain propagation loops, a domain propagating in a first of said loops in response to the application to said cell of binary information of a first kind and propagating in one of the remaining loops in response to the application of said cell of binary information of a second kind.

21. Logic apparatus comprising a matrix of equilateral cells in a sheet of material in which single wall magnetic domains can be selectively propagated, each of said cells having potential domain interaction points in common with adjacent cells at the midpoints of at least two of its sides, each of said cells further comprising magnetic domain propagating means defining at least two interconnected domain recirculating loops, said loops branching in the vicinity of at least one of said potential interaction points and at least one but not all of said loops passing at least one of the remaining interaction points.

22. The apparatus defined in claim 21 wherein said cells are square.

23. Magnetic domain logic apparatus including a sheet of material in which single wall magnetic domains can be moved, a magnetically soft overlay pattern juxtaposed with a surface of said sheet, and means for applying a reorienting magnetic field in the plane of said sheet characterized in that said overlay pattern defines a matrix of equilateral logic cells, each cell having at least two interconnected domain propagation loops for recirculating at least one domain associated with said cell.

24. The apparatus defined in claim 23 further characterized in that each of said cells in said matrix has associated therewith at least one adjacent cell in which propagation of the domain associated with said adjacent cell can be influenced by propagation of the domain associated with the interacting cell.

25. The apparatus defined in claim 23 further characterized in that each of said cells in said matrix has at least one adjacent cell in which the associated domain is deflected from a first of said domain propagation loops to a second of said domain propagation loops as a result of magnetic interaction of said associated domain with the domain associated with the interacting cell.

26. The apparatus defined in claim 25 further characterized in that said magnetic interaction of domains occurs only when said domain associated with said interacting cell is recirculating on a first of said loops in said interacting cell.

27. Time-shared magnetic domain logic apparatus including a sheet of material in which single wall magnetic domains can be moved for processing signal information from a plurality of sources comprising:

a magnetically soft overlay pattern juxtaposed with a surface of said sheet, said overlay pattern defining a plurality of domain propagating logic cells, each of said cells having at least two closed interconnected domain recirculating loops, said cells propagating information by the selective mutual repulsion of domains recirculating in adjacent cells and at least one of said cells having a branching interconnection of loops adapted to receive information to be processed;

means for time multiplexing information from said sources;

input transducer means responsive to said means for time multiplexing for applying said time multiplexed information to said cells adapted to receive information;

output transducer means for detecting the presence or absence of domains propagating along at least one but not all of said loops in at least one of said cells other than said cells adapted to receive information to produce a time multiplexed processed output signal; and means for demultiplexing said time multiplexed processed output signal.

28. The apparatus defined in claim 27 wherein said overlay pattern defining each of said cells having a branching interconnection of loops adapted to receive information to be processed is further arranged such that domains recirculating in said cell propagate along a first loop in said cell unless deflected into a second loop at said branching interconnection in response to information applied to said cell.

* * * * *